Dec. 6, 1966  J. L. REID  3,290,148
NOVEL PHOTOGRAPHIC PRODUCTS, PROCESSES AND COMPOSITIONS
Filed Nov. 28, 1962  4 Sheets-Sheet 1

INVENTOR
Jerome L. Reid
BY Brown and Mikulka
and
Robert M. Ford
ATTORNEY

Dec. 6, 1966  J. L. REID  3,290,148
NOVEL PHOTOGRAPHIC PRODUCTS, PROCESSES AND COMPOSITIONS
Filed Nov. 28, 1962  4 Sheets-Sheet 2

INVENTOR.
Jerome L. Reid
BY Brown and Mikulka
and
Robert M. Ford
ATTORNEY

Dec. 6, 1966  J. L. REID  3,290,148
NOVEL PHOTOGRAPHIC PRODUCTS, PROCESSES AND COMPOSITIONS
Filed Nov. 28, 1962  4 Sheets-Sheet 3

INVENTOR.
Jerome L. Reid
BY Brown and Mikulka
and
Robert M. Ford
ATTORNEY

United States Patent Office 3,290,148
Patented Dec. 6, 1966

3,290,148
NOVEL PHOTOGRAPHIC PRODUCTS, PROCESSES AND COMPOSITIONS
Jerome L. Reid, Watertown, Mass., assignor to Polaroid Corporation, Cambridge, Mass., a corporation of Delaware
Filed Nov. 28, 1962, Ser. No. 240,584
12 Claims. (Cl. 96—3)

The present invention relates to photography and, more particularly, to novel photographic products, processes and compositions.

It is a primary object of the present invention to provide novel photographic film units and processes utilizing same.

Another object of the present invention is to provide novel photosensitive elements, comprising not less than one silver halide emulsion, possessing increased speed and improved stability.

A further object of the present invention is to provide novel compositions, processes and products for obtaining silver, monochromatic and multichromatic images by photographic diffusion transfer processes which exhibit increased transfer image densities.

A still further object of the present invention is to provide novel compositions, processes and products for obtaining silver, monochromatic and multichromatic images by photographic diffusion transfer processes which exhibit decreased minimum transfer image densities.

A still further object of the present invention is to provide novel compositions, processes and products for obtaining silver, monochromatic and multichromatic images by photographic diffusion transfer techniques which exhibit improved high lights and light steps.

A still further object of the present invention is to provide novel photographic compositions, processes and products for obtaining multichromatic transfer images, using integral multilayer photosensitive elements, exhibiting improved color separation.

A still further object of the present invention is to provide compounds which are not only excellent stabilizers or antifogging agents for light-sensitive silver halide emulsions but, in addition, have the faculty of performing this function without lowering the sensitivity of the emulsion with which they are associated or without reducing the sensitivity of the emulsion to light of longer wavelengths attributable to the presence of optical sensitizing dyes.

A still further object of the present invention is to provide stabilized light-sensitive silver halide emulsions, especially silver halide emulsions exhibiting increased stability against the effects of dry and moist heat.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

In diffusion transfer process, for the formation of positive silver images, a latent image contained in an exposed photosensitive silver halide emulsion is developed and almost concurrently therewith a soluble silver complex is obtained by reaction of a silver halide solvent with the unexposed and undeveloped silver halide of said emulsion. Preferably, the photosensitive silver halide emulsion is developed with a processing composition in a viscous condition which is spread between the photosensitive element comprising the silver halide emulsion and a print-receiving element comprising a suitable silver precipitating layer. The processing composition effects development of the latent image in the emulsion and substantially contemporaneous therewith forms a soluble silver complex, for example, a thiosulfate or thiocyanate, with undeveloped silver halide. This soluble silver complex is, at least in part, transported in the direction of the print-receiving element and the silver thereof is largely precipitated in the silver precipitating layer of said element to form a positive image therein.

Additive color reproduction may be produced by exposing a photosensitive silver halide emulsion through an additive color screen having filter media or screen elements each of an individual additive color, such as red or blue or green, and by viewing the reversed or positive silver image, formed by the aforementioned transfer to a transparent print-receiving element, through the same or a similar screen which is suitably registered with the reversed positive image carried by the print-receiving layer.

U.S. Patents Nos. 2,647,049, issued July 28, 1953; 2,661,293, issued December 1, 1953; 2,698,244, issued December 28, 1954; 2,698,798, issued January 4, 1955; 2,807,735, issued August 13, 1957; all to Edwin H. Land, disclose subtractive color diffusion transfer processes wherein color coupling techniques are utilized which comprise, at least in part, reacting one or more developing agents and one or more color formers to provide a positive color image on a superposed image-receiving layer. The copending U.S. application of Howard G. Rogers, Serial No. 577,711, filed April 12, 1956, now U.S. Patent No. 3,019,124, issued January 30, 1962, discloses the manufacture of photographic color screen elements; and U.S. Patents Nos. 2,968,554, issued January 17, 1961, and 2,983,606, issued May 9, 1961, disclose diffusion transfer processes wherein a color screen element is utilized to provide a multicolor positive image to a superposed image-receiving layer. U.S. Patent No. 2,774,668, issued December 18, 1956, the copending U.S. application of Edwin H. Land and Howard G. Rogers, Serial No. 565,135, filed February 13, 1956, and the previously cited U.S. Patent No. 2,983,606 discloses diffusion transfer processes wherein complete dyes are utilized to provide a positive color image to a superposed image-receiving layer.

In processes of the type set forth in U.S. Patent No. 2,983,606, a photosensitive element containing a dye developer and a silver halide emulsion is exposed and wetted by a liquid processing composition, for example, by immersion, coating, spraying, flowing, etc., in the dark, and the exposed photosensitive element is superposed prior to, during, or after wetting, on a sheetlike support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition permeates the emulsion to initiate development of the latent image contained therein. The dye developer is immobilized or precipitated in exposed areas as a consequence of the development of the latent image. This immobilization is apparently at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. Under certain conditions, the layer of liquid processing composition may be utilized as the image-receiving layer. The image-receiving element receives a depthwise diffusion, from the developed emulsion, of unoxidized dye developer without appreciably disturbing the imagewise distribution thereof to provide the reversed or positive color image of the developed image. The image-receiving element may contain agents adapted to mordant or otherwise fix the diffused, unoxidized dye developer. If the color of the transferred dye developer is affected by changes in the pH of the image-receiving element, this pH may be adjusted in accordance with well-known techniques to provide a pH affording the desired color. The desired positive image is revealed by stripping the image-receiving layer from the photosensitive element at the end of a suitable imbibition period.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

It has now been unexpectedly found that photographic film units and processes, especially film units employed to effectuate the preceding diffusion transfer processes, as well as the transfer processes themselves, may be substantially improved by incorporating lithium nitrate in the film unit.

Lithium nitrate has been found to perform as an excellent stabilizer or antifogging agent for photosensitive silver halide emulsions. Furthermore, this compound possesses the faculty of performing this function without lowering the sensitivity of the emulsion with which it is associated or without reducing the sensitivity of the emulsion to light of longer wavelengths attributable to the presence of optical (spectral) sensitizing dyes.

In addition to the aforementioned stabilizing effects on photosensitive silver halide emulsions, the employment of lithium nitrate in silver, monochromatic and multichromatic transfer photographic processes, provides increased transfer image maximum density and decreased transfer image minimum density, substantially irrespective of the type of image-forming transfer components utilized.

In general, as with all additives, the optimum concentration of lithium nitrate to be employed should be determined empirically for each specific photographic system. However, it has been experimentally determined that, in general, the preferred concentrations of lithium nitrate employed as a silver halide emulsion stabilizing agent or antifoggant fall within the range of about 0.2 to 18%, by weight, that is, based on the total weight of silver present in the silver halide emulsion, depending on the fogging characteristics of the silver halide emulsion to be stabilized. Although concentrations in excess of the preferred range may be employed, increasing the concentration beyond the preferred limits, for example, 30% +, by weight, or more, generally provides no additional beneficial results. Conversely, concentrations below that of the preferred range, however, merely decrease below the effective level generally sought but do not obliterate the beneficial stabilization results obtained from employment of the lithium nitrate additive.

Where it is desired to increase the maximum density of a transfer image obtained in a diffusion transfer photographic process, it has been found that concentrations of lithium nitrate as low as 20 parts per million parts of silver may be effectively employed.

The lithium nitrate may be effectively located in one or more silver halide emulsion layers and/or adjacent layers of a film unit and/or in processing compositions for effectuating, for example, the diffusion transfer processing.

It will be recognized that although the beneficial results of the instant invention are in particular detailed herein in terms of diffusison transfer photographic processes, and products and compositions particularly adapted for use therein, the concept of the invention are also applicable to conventional photographic products and systems.

Figure 1:
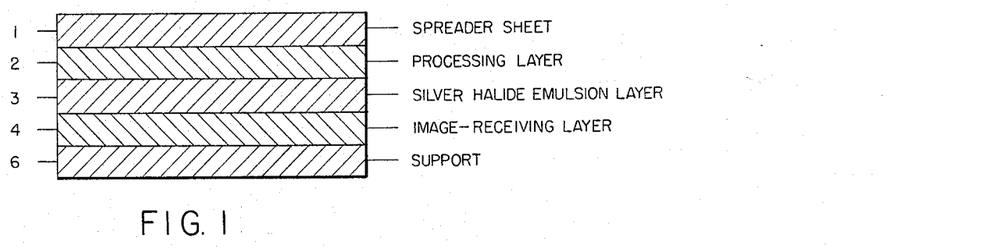
FIGURE 1 is a diagrammatic cross-sectional view of one embodiment of a photographic product, for use in obtaining silver diffusion transfer images, in accordance with the present invention, during processing and comprising a spreader sheet, a processing composition and a photorecording element which comprises a transparent support retaining an image-receiving layer and a silver halide emulsion layer in contiguous relationship.

Referring now to FIGURE 1, one embodiment of a film unit of the present invention, in the performance of a transfer process for the production of positive silver prints, comprises a spreader sheet 1, a layer of relatively viscous processing agent 2, a photosensitive silver halide emulsion layer 3, an image-receiving layer 4 preferably containing silver precipitating nuclei, such as the silver precipitating nuclei disclosed in U.S. Patent No. 2,698,237, issued December 28, 1954, and a suitable support layer 6. Support layer 6 may comprise an opaque material where a reflection print is desired or may comprise a transparent material where a transparency is desired.

Liquid layer 2 may be obtained by spreading a photographic processing composition, for example, in a manner disclosed in U.S. Patent No. 2,698,244, issued December 28, 1954. As disclosed in the aforementioned U.S. patent, the liquid processing composition may be disposed in a rupturable container so positioned in regard to the appropriate surface of the silver halide emulsion that, upon compression by spreader sheet 1, a substantially uniform layer 2 of processing composition is distributed over the surface of photosensitive emulsion 3, positioned distally from the image-receiving layer 4. The processing composition may be one of the film-forming processing compositions disclosed in U.S. Patent No. 2,543,181, issued February 27, 1951. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the spreading thereof as layer 2, but they may be in part or wholly added to the processing composition as it is spread between spreader sheet 1 and photosensitive silver halide emulsion 3, said agents being so located on or adjacent to the surface of one or both of said layers as to be dissolved by or otherwise interacted with the liquid agent when the latter wets said surface.

In carrying out the aforementioned transfer process, the photosensitive silver halide emulsion 3 is exposed to a predetermined subject matter to form therein a latent image of said subject matter. A substantially uniform layer 2 of processing composition is distributed on the external surface of said emulsion, as for example, according to the previously described procedure. Processing composition reagents permeate into the photosensitive emulsion and develop the latent image contained therein, according to the point-to-point degree of exposure of emulsion 3. Substantially contemporaneous with the development of the latent image, an imagewise distribution of soluble silver complex is formed from unexposed and undeveloped silver halide within said emulsion. At least part of said silver complex, solubilized, is transferred, by imbibition, to the print-receiving stratum 4. The transferred silver complex is there precipitated to provide a positive, reversed image of the latent image. Subsequent to formation of the positive image in the image-receiving layer 4, dissociation of said layer from emulsion layer 3 may be effected, as for example, by manually stripping same from contact with emulsion layer 3. A conventional stripping layer may be provided to facilitate separation of emulsion layer 3 from image-receiving layer 4 subsequent to transfer processing. The stripping layer may be coated on the surface of the print-receiving layer 4 and the photosensitive emulsion thereafter coated on the external surface of the stripping layer.

Figure 2:
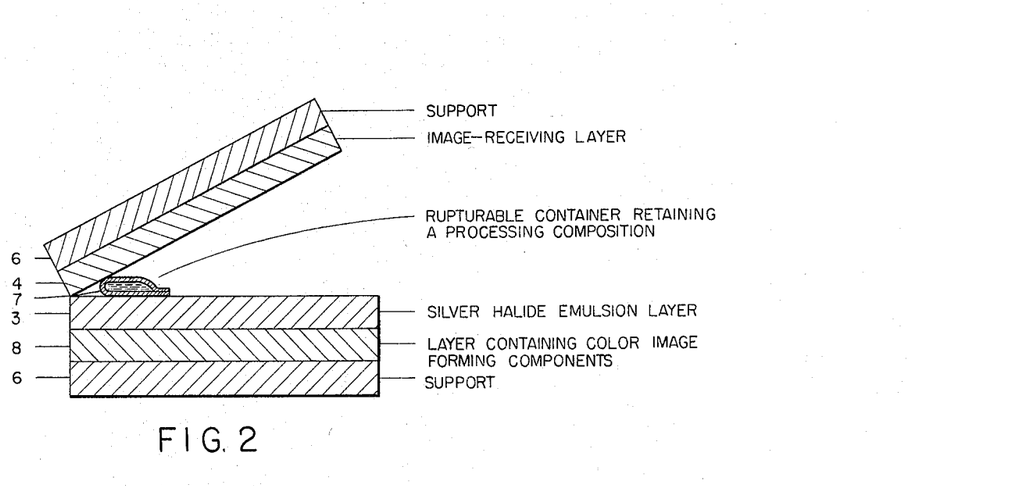
FIG. 2 is a diagrammatic cross-sectional view of one embodiment of a photographic product, for use in obtaining monochromatic diffusion transfer images, in accordance with the present invention, and comprises a photosensitive element containing a silver halide emulsion layer and a layer retaining color image-forming components, a frangible container holding a processing composition and an image-receiving element.

FIG. 2 of the accompanying drawings illustrates one method of processing a silver halide emulsion to obtain a monochromatic transfer image in accordance with this invention. The photosensitive element comprises a support 6, a layer 8 containing color image-forming components, such as the dye developers described hereinbefore, and a silver halide emulsion layer 3. As shown in the particular embodiment depicted in FIG. 2, the photosensitive element is shown in a spread-apart relationship (as, for example, during exposure) with the photosensitive element having mounted thereon a rupturable container 7 holding a processing composition. The image-receiving element comprises a support 6 and an image-receiving layer 4. After exposure, the image-receiving element is brought into superposed relationship with the photosensitive element and frangible container 7 is ruptured by application of suitable pressure, for example, by advancing between a pair of opposed, suitably gapped rolls (not shown), and the liquid processing composition is spread layerwise between the superposed elements. The processing composition permeates the silver halide emulsion and develops a latent image contained therein. From unexposed areas, the color image-providing components transfer to the superposed image-receiving element, to constitute thereon a positive color image in terms of exposure. The image-receiving element may then be separated from its superposed relationship with the photosensitive element after at least a portion of the color image-forming components have been transferred.

It is also contemplated to utilize in the preparation of monochromatic images, a film structure of the type previously described in explanation of FIGURE 1, wherein the photosensitive element is coated over the image-receiving layer and the processing composition must permeate through the emulsion before reaching the image-receiving layer.

Multicolor images may be obtained using color image-forming components such as, for example, the previously mentioned dye developers, in diffusion transfer processes by several techniques. One such technique contemplates the use of a photosensitive silver halide stratum comprising at least two sets of selectively sensitized minute photosensitive elements arranged in the form of a photosensitive screen. Transfer processes of this type are disclosed in the previously noted U.S. Patents Nos. 2,968,554 and 2,983,606. In such an embodiment, each of the minute photosensitive elements has associated therewith an appropriate dye developer in or behind the silver halide emulsion portion. In general, a suitable photosensitive screen, prepared in accordance with the disclosures of said patents comprises minute red-sensitized emulsion elements, minute green-sensitized emulsion elements and minute blue-sensitized emulsion elements arranged in side-by-side relationship in a screen pattern and having associated therewith, respectively, a cyan dye developer, a magenta dye developer and a yellow dye developer.

Another process for obtaining multicolor transfer images utilizing dye developers employs an integral multilayer photosensitive element, such as is disclosed in the aforementioned copending U.S. application Serial No. 565,135, wherein at least two selectively sensitized photosensitive strata are superposed on a single support and are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata may be separated from other sets by suitable interlayers, for example, by a layer of gelatin or polyvinyl alcohol.

Figure 3:
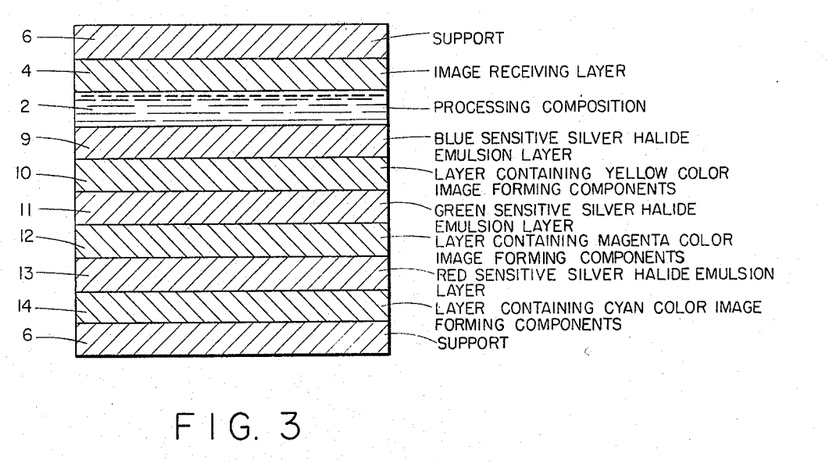
FIG. 3 is a diagrammatic cross-sectional vief of one embodiment of a photographic product, for use in obtaining multicolor diffusion transfer images, in accordance with the present invention, during processing and comprises a multilayer photoresponsive element, an image-receiving element and a processing composition.

A multilayer photosensitive element of the type just described is illustrated in FIG. 3 of the accompanying drawings and is depicted during processing. An exposed photosensitive element comprises: a support 6; a layer 14 containing a cyan color image-forming component and a red-sensitive silver halide emulsion layer 13; a layer 12 of a magenta color image-forming component and a green-sensitive silver halide emulsion layer 11; a layer 10 containing a yellow color image-forming component and a blue-sensitive silver halide emulsion layer 9. As noted above, each set of silver halide emulsion and associated color image-forming components containing strata may be separated from other sets thereof by suitable interlayers (not shown), for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

Referring again to FIG. 3, a multilayer photosensitive element is shown in processing relationship with an image-receiving element and a layer 2 of a processing composition. The image-receiving element comprises a support 6 and an image-receiving layer 4. As noted in connection with FIG. 2, the liquid processing composition is effective to initiate development of the respective exposed silver halide strata. After a suitable imbibition period, during which at least a portion of the dye developer associated with unexposed areas of each of said emulsions is transferred to the superposed image-receiving element, the latter element may be separated to reveal the positive multicolor image.

A further technique for obtaining multicolor images employs a plurality of photosensitive elements associated with an appropriate number of image-receiving elements and adapted to be treated with one or more liquid processing compositions, the appropriate dye developers, for example, being incorporated in the photosensitized elements. Examples of film structures of this type are disclosed in U.S. Patent No. 2,647,049, issued July 28, 1953.

The preceding color image-forming components, for example, dye developers, are preferably selected for their ability to provide colors that are useful in carrying out subtractive color photography, i.e., cyan, magenta and yellow. It should be noted that it is within the scope of this invention to use mixtures of dye developers, for example, to obtain a desired color, e.g., black. Thus it is to be understood that the expression "color" as used herein is intended to include the use of a plurality of colors to obtain black, as well as the use of a single black dye developer.

The dye developers employed in the processes of this invention may be incorporated in the photosensitive elements, for example in, on, or behind the respective silver halide emulsion. The dye developer may, for example, be in a coating or layer behind the silver halide emulsion and such a layer of dye developer may be applied by the use of a coating solution containing about 0.5 to 8%, by weight, of the respective dye developer.

The liquid processing composition referred to in explanation of FIGS. 2 and 3 comprises at least an aqueous solution of an alkaline compound, for example, diethylamine, sodium hydroxide, or sodium carbonate. If the liquid processing composition is to be applied to the emulsion by being spread thereon, preferably in a relatively thin uniform layer, it may also include a viscosity-increasing compound constituting a film-forming material of the type which, when said composition is spread and dried, forms a relatively firm and relatively stable film. A preferred film-forming material is a high molecular weight polymer such as a polymeric, water-soluble ether which is inert to an alkaline solution such as, for example, a hydroxyethyl cellulose or sodium carboxymethyl cellulose. Other film-forming materials or thickening agents whose ability to increase viscosity is substantially unaffected if left in solution for a long period of time may also be used. The film-forming material is preferably contained in the processing composition in suitable quantities to impart to said composition a viscosity in excess of 1,000 centipoises at a temperature of approximately 24° C. and preferably of the order of 1,000 to 200,000 centipoises at said temperature. Illustrations of suitable liquid processing compositions may be found in the several patents and copending applications herein mentioned and also in examples herein given. Under certain circumstances, it may be desirable to apply a liquid processing composition to the photosensitive element prior to exposure, in accordance with the technique described in the copending U.S. application of Edwin H. Land, Serial No. 498,672, filed April 1, 1955, now U.S. Patent No. 3,087,816, issued April 30, 1963.

It will be noted that the liquid processing composition employed in FIGS. 2 and 3 may contain an auxiliary or accelerating developing agent, such as p-methylaminophenol, 2,4-diaminophenol, p-benzylaminophenol, hydroquinone, toluhydroquinone, phenylhydroquinone, 4'-methylphenylhydroquinone, etc. It is also contemplated to employ a plurality of auxiliary or accelerating developing agents, such as a 3-pyrazolidone developing agent and a benzenoid developing agent, as disclosed in U.S. Patent No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethyleniminohydroquinone. Such auxiliary developing agents may be employed in the liquid processing composition or they may be initially incorporated, at least in part, in the silver halide emulsion strata or the strata containing the dye developers. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed silver halide.

In addition, development may be effected in the presence of an onium compound, particularly quaternary ammonium compound, in accordance with the processes disclosed in the copending U.S. application of Milton Green and Howard G. Rogers, Serial No. 50,851, filed August 22, 1960, now U.S. Patent No. 3,173,786, issued March 16, 1965.

Figure 4:
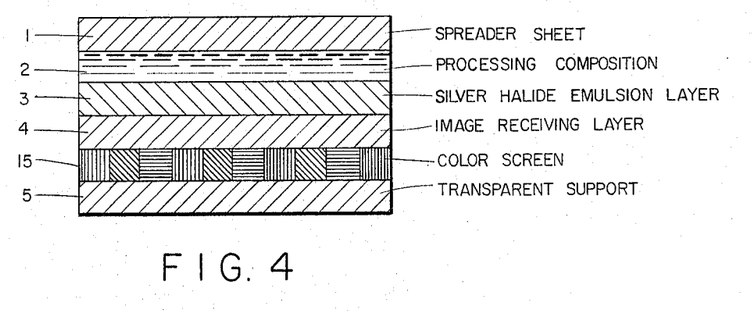
FIG. 4 is a diagrammatic cross-sectional view of one embodiment of a photographic product, for use in obtaining additive multicolor diffusion transfer images, in accordance with the present invention, during processing, and comprising a spreader sheet, a processing composition and a photorecording element which comprises a transparent support retaining an additive color screen layer, an image-receiving layer and a silver halide emulsion layer in contiguous relationship.
Figure 5:
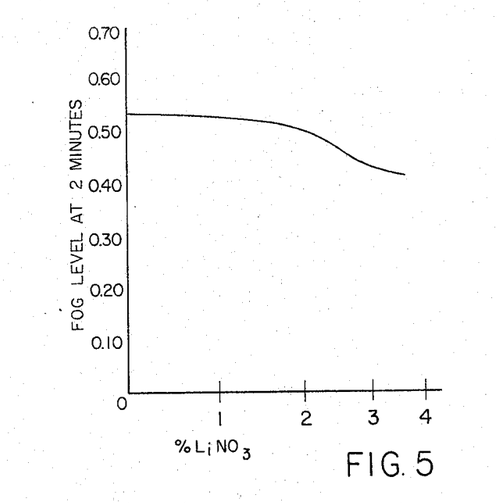
FIG. 5 is a graphic illustration of certain fog stability characteristics of photoresponsive products fabricated and employed in accordance with the present invention.
Figure 6:
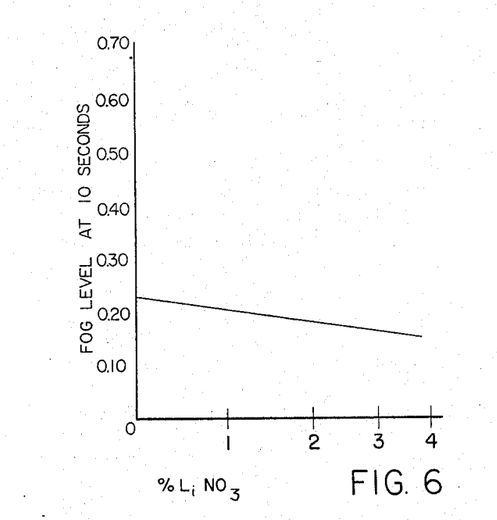
FIG. 6 is a graphic illustration, similar to FIG. 5, of additional fog stability characteristics of photoresponsive products fabricated and employed in accordance with the present invention.
Figure 7:
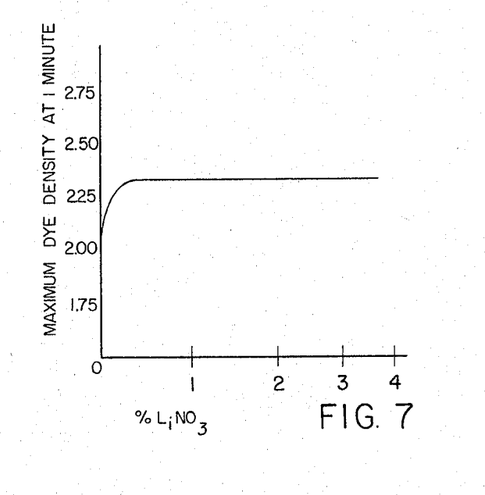
FIG. 7 is a graphic illustration of the transfer image characteristics of photographic products fabricated and employed to obtain color transfer images, in accordance with the present invention, wherein the curve designates the characteristic transfer image maximum dye density of a plurality of said products.
Figure 8:
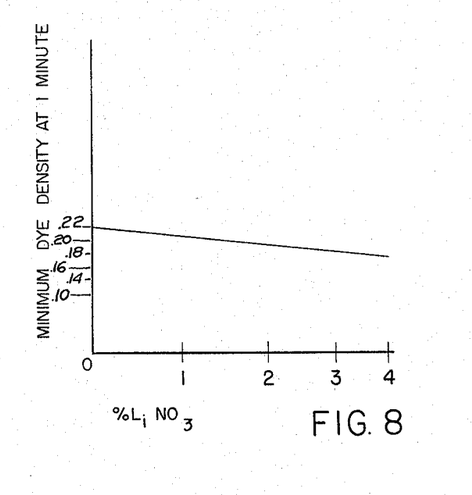
FIG. 8 is a graphic illustration, similar to FIG. 6, wherein the curve designates the characteristic transfer image minimum dye density of a plurality of said products.

As illustrated in FIG. 4, one embodiment of the present invention for use in additive multicolor diffusion transfer processes is a composite film unit comprising a transparent support 5, an additive color screen layer 15, an image-receiving layer 4 preferably containing silver precipitating nuclei, and a photosensitive silver halide emulsion 3.

In carrying out an additive multicolor diffusion transfer process utilizing the aforementioned composite film unit, exposure of the photosensitive silver halide emulsion to a predetermined subject matter is effected through color screen layer 15. A liquid processing composition is applied to photosensitive emulsion 3, as for example, according to the procedure previously described in explanation of FIGURE 1. The liquid processing composition permeates into photosensitive emulsion 3, developing the latent image contained therein, forming an imagewise distribution of soluble silver complex in the unexposed areas thereof, and transferring, at least part of said imagewise distribution, by imbibition, toward image-receiving layer 4 wherein the silver of said complex is precipitated to provide a reversed positive silver image of said latent image. Dissociation of emulson layer 3 from image-receiving layer 4 may be accomplished, for example, according to the procedure previously described in explanation of FIG. 1. As previously stated, in additive multicolor processes the viewing of the positive image takes place through a stationarily registered color screen element, either that screen element through which exposure was accomplished or a duplicate thereof. Although in the aforementioned process exposure is accomplished through the stationary color screen element predisposed in the image-receiving element, thus avoiding the problems incident upon attempts to register a mobile screen element with the deposited silver image, it must be noted that the inventive concept of the present specification is equally applicable to the numerous additive multicolor diffusion transfer processes utilizing color screen elements in combination with silver transfer processes, such as, for example, the additive multicolor transfer processes disclosed in U.S. Patent No. 2,614,926, issued October 21, 1952.

U.S. Patent No. 2,707,150, issued April 26, 1955, discloses additive multicolor processes utilizing a color screen element in a photosensitive emulsion wherein, subsequent to the selective exposure of the photosensitive emulsion through said color screen and substantially simultaneous with the development of the latent image contained therein, the color screen element filter media, preferably soluble dyes, transfer, at least in part, by inhibition, to an image-receiving element to form therein a substantially duplicate screen pattern of the original color screen.

The present invention will be illustrated in greater detail in conjunction with the following specific examples which set out representative products, processes and compositions which, however, are intended to be illustrative and not of limiting effect.

EXAMPLE 1

In accordance with the explanation of FIG. 2, a photosensitive element was prepared by coating a gelatin-coated film base with sufficient 1,4-bis-($\alpha$-methyl-$\beta$-hydroquinonylethylamino)-4,8-dihydroxy-anthraquinone, dispersed in a 4% solution of gelatin, to give a coverage of 100 to 110 mg. per square foot, which dye developer is disclosed in the copending U.S. application of Blout et al., Serial No. 824,785, filed July 3, 1959, now abandoned, the subject matter of which has been incorporated in Serial No. 233,461, filed October 26, 1962, now U.S. Patent No. 3,135,606, issued June 2, 1964. After this coating had dried, a silver iodobromide emulsion containing 230 to 250 mg. of silver per square foot and 1.17% lithium nitrate, by weight of silver, was applied. The photosensitive element was then exposed and processed by spreading an aqueous liquid processing composition comprising:

| | |
|---|---|
| Water _____________________________________cc__ | 100 |
| Sodium hydroxide ________________________grams__ | 5.0 |
| Hydroxyethyl cellulose ______________________do____ | 4.03 |
| Benzotriazole _____________________________do____ | 2.3 |
| Sodium thiosulfate _________________________do____ | 1.15 |
| N-benzyl-$\alpha$-picolinium bromide ____________do____ | 2.3 | between said photosensitive element and an image-receiving element comprising a sheet of cellulose acetate subcoated baryta paper having coated thereon a mixture of polyvinyl alcohol and poly-4-vinylpyridine, as said elements were brought into superposed relationship. After an imbibition period of one minute, the image-receiving element was separated and revealed a monochromatic reversed cyan dye image of the photosensitive element's exposure response.

The last-mentioned procedure was first repeated employing imbibition periods of 10 seconds and 2 minutes, respectively, and then repeated employing 0, 2.34, 4.67 and 9.35% lithium nitrate, by weight of silver, and imbibition periods of 10 seconds, 1 minute and 2 minutes, respectively.

FIGS. 5, 6, 7 and 8 of the drawings detail, respectively, by means of the curves set forth, the decreased 2 minute fog levels, the decreased 10 second fog levels, the increased transfer image maximum densities, and the decreased transfer image minimum densities achieved by the employment of varying concentrations of lithium nitrate in the illustrative procedure set forth.

Multicolor diffusion transfer processes were conducted employing varying concentrations of lithium nitrate, the image-receiving element and processing composition set forth in the preceding example, and multilayer photosensitive elements prepared in a manner similar to that disclosed in the aforementioned copending U.S. application Serial No. 565,135 and set forth in explanation of FIG. 3. In general, the photosensitive elements comprised a support carrying a red-sensitive silver halide emulsion stratum, a green-sensitive silver halide emulsion stratum and a blue-sensitive silver halide emulsion stratum; said emulsions having dispersed in water-immersible organic solvents and contained in separate alkali-permeable gelatin layers behind them, respectively, a cyan dye developer, a magenta dye developer and a yellow dye developer. The particular dye developers employed in the photosensitive elements were 1,4-bis-($\alpha$-methyl-$\beta$-hydroquinonyl-ethylamino)-5,8-dihydroxyanthraquinone (a cyan dye developer); 2-(p-[2',5'-dihydroxyphenethyl]-phenylazo)-4-isopropoxy-1-naphthol (a magenta dye developer); and 1-phenyl - 3 - n - hexylcarboxamido - 4-(p-[hydroquinonylethyl]-phenylazo)-5-pyrazolone (a yellow dye developer). The last-mentioned yellow and magneta dye developers are disclosed in the copending U.S. application of Elkan R. Blout, Milton Green and Howard G. Rogers, Serial No. 145,978, filed October 18, 1961, now U.S. Patent No. 3,134,764, issued May 26, 1964.

The fog inhibition, increased transfer image maximum densities and decreased minimum densities results achieved were analogous to those detailed in the drawings with regard to monochromatic diffusion transfer processes.

EXAMPLE 2

A silver diffusion transfer process was conducted by coating a gelatin-coated film base with a silver iodobromide emulsion containing 230 to 250 mg. of silver per square foot and 9.0% lithium nitrate, by weight, of silver. The photosensitive element was then exposed and processed by rupturing an aqueous liquid processing composition retaining pod between the photosensitive element and an image-receiving element as the respective elements were brought into superposed relationship. (Both the image-receiving element and processing composition retaining pod employed were those commercially available from Polaroid Corporation, Cambridge, Massachusetts, under the trade designation of Type 42.) After an imbibition period of approximately 10 seconds, the image-receiving element was separated and revealed a reversed, positive silver transfer of the exposure pattern.

The silver transfer image prepared and processed above exhibited a maximum density of 1.58 and a $\gamma$ of 1.98 versus the control maximum density of 1.24 and $\gamma$ of 1.59 obtained in the absence of lithium nitrate.

EXAMPLE 3

A photosensitive element prepared in the manner set forth in Example 2 was exposed and then developed for 5 minutes at 68° F., with processing composition which comprised commercial Kodak processing composition DK–60A (available from Eastman Kodak Co., Rochester, New York).

The developed image exhibited a maximum density of 2.94, a minimum density of 0.04 and a $\gamma$ of 1.84 versus the control maximum density of 2.65, minimum density of 0.15 and $\gamma$ of 1.50 obtained in the absence of lithium nitrate.

Although as illustrated in the examples, the lithium nitrate is directly incorporated in the silver halide emulsion itself, that is, the preferred method, it will be recognized that the lithium nitrate can be effectively incorporated, in part or in whole, in the processing composition and/or other layers of the film unit, for example, in a permeable layer adjacent the silver halide emulsion. In general, the most efficacious method has been determined to be that of directly disposing the lithium nitrate in the silver halide emulsion. For example, the lithium nitrate may be advantageously incorporated in the silver halide emulsion during the ripening or sensitivity increasing stage of the emulsion manufacturing process or as a "coating final" just prior to coating the emulsion on a suitable support member. However, it will be recognized that the lithium nitrate may, in fact, be added at any time during or subsequent to silver halide formation in its colloid carrier, for example, gelatin, polyvinyl alcohol, casein, etc.

A specific embodiment which has been found to provide particularly advantageous results, especially in multichromatic diffusion transfer processes of the type set forth hereinbefore, comprises employing an aqueous alkaline diffusion transfer processing composition containing lithium ions.

In general, improved color separation and increased dye densities are provided in multicolor transfer processes employing lithium ion containing transfer processing compositions in combination with lithium nitrate containing film units. Lithium ion containing transfer processing compositions may be readily and flexibly prepared by the addition of an ionizable lithium salt to the aqueous alkaline solution such as the nitrate, hydroxide, sulfate, phosphate, citrate, borate, acetate, carbonate, etc., or any salt of lithium that does not deleteriously interfere with photographic processing. Although, under the alkaline conditions of the processing compositions, lithium salts are, in general, 100% ionized, it is preferred that a lithium salt such as lithium hydroxide be employed, in order not to effect any change in the processing composition's conditions, as for example, the preferred alkaline pH.

It also has been found that a concentration of lithium ions in the range of about 0.002 to about 0.07%, by weight, provides the optimum results, when employed in combination with the preferred concentrations of lithium nitrate, in multicolor film units.

In all products of the type described in FIGS. 2 and 3 employed in the diffusion transfer processes of this invention, it is preferable to expose from the emulsion side. It is, therefore, desirable to hold the photosensitive element and the image-receiving element together at one end thereof by suitable fastening means in such manner that the photosensitive element and the image-receiving element may be spread apart from their superposed processing position during exposure. A camera apparatus suitable for processing roll film of the type just mentioned is provided by the Polaroid Land Camera, sold by Polaroid Corporation, Cambridge, Massachusetts, or similar camera structure such, for example, as the camera forming the subject matter of U.S. Patent No. 2,435,717. Camera apparatus of this type permits successive exposure of individual frames of the photosensitive element from the emulsion side thereof as well as individual processing of an exposed frame by bringing said exposed frame into superposed relation with a predetermined portion of the image-receiving element while drawing these portions of the film assembly between a pair of pressure rollers which require a container associated therewith and effect the spreading of the processing liquid released by rupture of said container, between and in contact with the exposed photosensitive frame and the predetermined, registered area of the image-receiving element.

As previously noted, the print-receiving stratums set forth in FIGS. 1 and 4 preferably contain silver precipitating agents or nuclei, whose presence during the transfer process has a desirable effect on the amount and character of the silver precipitated during positive print formation. Examples of such silver precipitating agents are the metallic sulfides and selenides, thiooxalates, and thioacetamides, and colloidal metals disclosed in U.S. Patent No. 2,698,237. It is also desirable, as disclosed in that patent, to provide, as the vehicle for the silver precipitating agents, a macroscopically continuous film that consists of submacroscopic agglomerates of minute particles of a suitable water-insoluble, inorganic, preferably siliceous, material such as silica aerogel. The use of such a vehicle for the precipitating agents tends to aggregate the silver that is precipitated into its most effective condition for print formation.

Silver halide solvents suitable for incorporation in the processing composition include conventional fixing agents such as sodium thiosulfate, sodium thiocyanate, ammonium thiosulfate, or associations of cyclic imides and nitrogenous bases such as associations of barbiturates or uracils and ammonia or amines. Of these, the conventional fixing agents specified are preferred.

It will be apparent that the relative proportions of the agents of the developer composition set forth herein may be altered to suit the requirements of the operator. Thus, it is within the scope of this invention to modify the herein described developing compositions by the substitution of preservatives, alkalies, silver halide solvents, etc., other than those specifically mentioned. When desirable, it is also contemplated to include, in the developing composition, components such as restrainers, accelerators, etc. Similarly, the concentration of developing agent may be varied over a wide range and when desirable the developing agent may be disposed in the photosensitive element, prior to the exposure of the emulsion, in a separate permeable layer of the photosensitive element and/or in the photosensitive emulsion.

The emulsion support layers designated in the drawings as 5 and 6 may comprise any of the various types of conventional rigid or flexible supports, for example, glass, paper, metal, and polymeric films of both synthetic types and those derived from naturally occurring products. Suitable materials include paper; aluminums; polymethacrylic acid, methyl and ethyl esters; vinyl chloride polymers; polyvinyl acetal; polyamides such as nylon; polyesters such as polymeric films derived from ethylene glycolterephthalic acid; and cellulose derivatives such as cellulose acetate, triacetate, nitrate, propionate, butyrate, acetate-propionate, or acetate-butyrate.

It will be understood that silver halides of varying halide concentrations may be advantageously employed and that the silver halide emulsions employed may be chemically sensitized by any of the accepted procedures. For example, the emulsions may be chemically sensitized with sulfur compounds such as sodium thiosulfate or thiourea; with reducing substances such as stannous chloride; with salts of noble metals such as gold, rhodium and platinum; with amines and polyamines; with quaternary ammonium compounds such as $\alpha$-picolinium bromide, etc.; and with polyethylene glycols and derivatives of same.

The emulsions may also be optically sensitized with cyanine and merocyanine dyes as described in U.S. Patents Nos. 1,846,301; 1,846,302; 1,942,854; 1,990,507; 2,112,140; 2,165,338; 2,493,747; 2,493,748; 2,503,776; 2,519,001; 2,666,761; 2,734,900; 2,739,964; etc.; and where desired, suitable restrainers, accelerators, preservatives, coating aids, and/or additional stabilizers may be included in the composition of the emulsion.

The nature and construction of rupturable containers such as that shown in FIG. 2 is well understood in the art; see, for example, U.S. Patent No. 2,543,181, issued February 27, 1951, and U.S. Patent No. 2,634,886, issued April 14, 1953.

The image-receiving element, for use in monochromatic and multichromatic subtractive color processes, comprises an image-receiving layer of opaque or transparent material which is liquid permeable and dyeable from alkaline solutions and which for purposes of simplicity may comprise a single sheet of permeable material, for example, paper. This element, however, may comprise a support upon which at least one liquid-permeable and dyeable layer is mounted. The support layer may have a water-impermeable subcoat over which the stratum of permeable and dyeable material is applied. In certain instances, the dyeable layer may comprise a layer of liquid processing composition which is adapted to remain adhered to the support layer upon stripping.

It will be apparent that, by appropriate selection of the image-receiving element from among suitable known opaque and transparent materials, it is possible to obtain either a colored positive reflection print or a colored positive transparency.

As examples of useful image-receiving materials, mention may be made of nylon such as N-methoxymethyl polyhexamethylene adipamide; partially hydrolyzed polyvinyl acetate; polyvinyl alcohol with or without plasticizers; baryta paper, i.e., a support having a baryta coating thereon; cellulose acetate with filler as, for example, one-half cellulose acetate and one-half oleic acid; gelatin; and other materials of a similar nature, as is well known in the art. Preferred materials comprise polyvinyl alcohol or gelatin containing a dye mordant such as poly-4-vinylpyridine, as disclosed in the copending U.S. application of Howard C. Haas, Serial No. 50,848, filed August 22, 1960, now U.S. Patent No. 3,148,061, issued September 8, 1964.

While a rupturable container, such as container 7 in FIG. 2, provides a convenient means for spreading a liquid processing composition between layers of a film unit whereby to permit the processing to be carried out within a camera apparatus, the practices of this invention may be otherwise effected. For example, a photosensitive element, after exposure in suitable apparatus and while preventing further exposure thereafter to actinic light, may be removed from such apparatus and permeated with the liquid processing composition, as by coating the composition on said photosensitive element or otherwise wetting said element with the composition, following which the permeated, exposed photosensitive element, still, without additional exposure to actinic light, is brought into contact with the image-receiving element for image formation in the manner heretofore described.

It is also to be understood that the invention may be successfully practiced without the use of a film-forming material in the liquid processing composition. As an illustration, a non-viscous liquid processing composition is particularly applicable with the processing technique last mentioned above and may be applied to the exposed photosensitive element by imbibition or coating practices and may be similarly applied to the image-receiving element before said elements are brought into superposed relation or contact for carrying out the transfer of non-immobilized image-providing substances.

In all examples of this specification, percentages of components are given by weight unless otherwise indicated.

Throughout the specification and appended claims, the expression "positive image" has been used. This expression should not be interpreted in a restrictive sense since it is used primarily for purposes of illustration, in that it defines the image produced on the image-carrying layer as being reversed, in the positive-negative sense, with respect to the image in the photosensitive element. As an example of an alternative meaning for "positive image," assume that the photosensitive element is exposed to actinic light through a negative transparency. In this case, the latent image in the photosensitive element will be a positive and the image produced on the image-carrying layer will be a negative. The expression "positive image" is intended to cover such an image produced on the image-carrying layer.

Throughout the specification and claims, the expression "superposing" has been used. This expression is intended to cover the arrangement of two layers in overlying relation to each other either in face-to-face contact or in separated condition and including between them at least one layer of stratum of a material which may be a viscous liquid.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A photographic product which comprises a plurality of layers including a support, a silver halide gelatin emulsion located in a layer on said support, said silver halide gelatin emulsion having associated therewith, in a layer on the same side of said support, lithium nitrate.

2. A photographic product as defined in claim 1, wherein said lithium nitrate and said silver halide emulsion are located in the same layer.

3. A photographic product as defined in claim 1, wherein said lithium nitrate is disposed in a separate, permeable layer adjacent said silver halide emulsion.

4. A photographic product as defined in claim 1, wherein said silver halide gelatin emulsion has associated therewith, in a layer on the same side of said support, a dye which is a silver halide developing agent.

5. In a diffusion transfer process which comprises the steps of developing an exposed photosensitive element containing a silver halide emulsion, with a diffusion transfer processing composition, forming thereby an imagewise distribution of image-forming components in said photosensitive element, as a function of the point-to-point degree of exposure thereof, and transferring, at least part of said imagewise distribution, by diffusion, to a contiguous image-receiving layer to provide thereto a transfer image, the improvement which comprises conducting said process in the presence of lithium nitrate.

6. In a silver diffusion transfer process which comprises the steps of developing an exposed silver halide emulsion with an aqueous alkaline solution containing a silver halide developing agent and a silver halide solvent, substantially contemporaneous with said development, contacting unexposed and undeveloped silver halide therein with said silver halide solvent and forming thereby an imagewise distribution of a soluble silver complex in unexposed areas of said emulsion, as a function of the point-to-point degree of exposure thereof, transferring from said emulsion, at least in part, by imbibition, said imagewise distribution of soluble silver complex to a print-receiving layer, containing silver precipitating nuclei, in superposed relationship to said emulsion, and there precipitating silver complex to provide thereby a reversed, positive silver transfer print, the improvement which comprises conducting said process in the presence of lithium nitrate.

7. In a process of forming diffusion transfer images in color which comprises the steps of developing an exposed photosensitive element comprising a plurality of layers including a silver halide emulsion layer, at least one of said layers containing a dye, which dye is a silver halide developing agent, by contacting said element with an aqueous alkaline solution, immobilizing said dye in the exposed areas of said element, as a result of development, forming thereby an imagewise distribution of mobile dye, as a function of the point-to-point degree of exposure of said element, and transferring, by imbibition, at least a portion of said imagewise distribution of mobile dye to a superposed image-receiving layer to provide thereto a positive dye image, the improvement which comprises conducting said process in the presence of lithium nitrate.

8. In a multicolor diffusion transfer process which comprises the steps of developing an exposed photosensitive element comprising a plurality of layers including blue-sensitive, green-sensitive and red-sensitive silver halide gelatin emulsion layers mounted on a common support, said blue-sensitive, green-sensitive and red-sensitive silver halide gelatin emulsion layers having positioned contiguous, respectively, yellow, magenta and cyan dyes, each of said yellow, magenta and cyan dyes being a silver halide developing agent, by permeating said photosensitive element with an aqueous alkaline processing composition, immobilizing said yellow, magenta and cyan dyes in exposed areas, as a result of development, forming thereby an imagewise distribution of mobile yellow, magenta and cyan dye, as a function of the point-to-point degree of exposure of said element, and transferring, by imbibition, at least a portion of each of said imagewise distributions of mobile dye to a superposed image-receiving layer to provide thereto a multicolor positive dye image, the improvement which comprises conducting said process in the presence of lithium nitrate.

9. The process as defined in claim 8, wherein said aqueous alkaline processing composition includes lithium ions.

10. The process as defined in claim 8, wherein said lithium nitrate is disposed in at least one of said blue-sensitive, green-sensitive and red-sensitive silver halide gelatin emulsions prior to developing said photosensitive element.

11. The process as defined in claim 10, wherein said lithium nitrate is present in a concentration from about 0.2 to 18%, by weight, of silver.

12. The process as defined in claim 11, wherein said aqueous alkaline processing composition includes lithium ions in a concentration of from about 0.002 to 0.07%, by weight.

References Cited by the Examiner

Gauvin, Science et inds. phot., 23A, pages 242–8 (1952).

Ottewill et al., Kolloid-Zeitschrift, 173, pages 122–8 (1960).

J. TRAVIS BROWN, *Acting Primary Examiner.*